United States Patent [19]
Cuckler et al.

[11] 3,733,602
[45] May 15, 1973

[54] MICROWAVE INTRUSION DETECTING SYSTEM AND APPARATUS

[75] Inventors: Virgil A. Cuckler, Scottsdale; Laverne A. Wente, Tempe, both of Ariz.

[73] Assignee: Motorola, Inc., Franklin Park, Ill.

[22] Filed: May 20, 1971

[21] Appl. No.: 145,169

[52] U.S. Cl...........343/5 PD, 340/258 R, 340/258 B, 343/6.5
[51] Int. Cl.............................................G08b 13/24
[58] Field of Search........................343/5 PD, 6.5 R; 340/258 R, 258 B

[56] References Cited

UNITED STATES PATENTS

| | | | |
|---|---|---|---|
| 3,471,845 | 10/1969 | Sokoloff | 343/5 PD |
| 3,618,083 | 11/1971 | Burley et al. | 343/5 PD |
| 3,171,108 | 2/1965 | MacKeen | 343/5 PD |
| 3,378,834 | 4/1968 | Corbell | 340/258 R |
| 3,264,646 | 8/1966 | Gale | 340/258 R |

*Primary Examiner*—Benjamin A. Borchelt
*Assistant Examiner*—G. E. Montone
*Attorney*—Mueller & Aichele

[57] ABSTRACT

A digital microwave intrusion detecting system and apparatus is disclosed wherein a plurality of repeater/transponders with receiving and transmitting antennas define a perimeter and in response to each interrogation pulse sent down the perimeter reply pulses are received back at the monitoring location corresponding in number to the last transponder to send a reply. The location of the perimeter violation is defined by the last transponder to reply to an interrogation pulse. If a certain number of replies, for example one, are not received back from all transponders in response to an interrogation pulse a warning signal is given and if a different number of replies are not received back, as for example, two in succession, an alarm signal is given that the perimeter has been violated.

15 Claims, 5 Drawing Figures

Patented May 15, 1973

INVENTOR
VIRGIL A. CUCKLER
BY LAVERNE A. WENTE

ATTY'S.

Patented May 15, 1973

INVENTOR
VIRGIL A. CUCKLER
BY LAVERNE A. WENTE

Mueller & Aichele
ATTY'S.

MICROWAVE INTRUSION DETECTING SYSTEM AND APPARATUS

BACKGROUND OF THE INVENTION

This invention relates to microwave intrusion detection apparatus and more particularly to such apparatus utilizing high frequency pulses and it is an object of this invention to provide improved apparatus of this character.

Intrusion detecting devices and systems utilizing microwaves are known. In such devices and systems, a series of reflectors may be disposed in such a manner as to define a perimeter the violation or intrusion of which is intended to be detected. However, the information provided thereby is only that the perimeter has been violated without at the same time providing an indication, at the monitoring station, of the point or location where the violation occurred. Accordingly, it is a further object of the invention to provide an improved microwave intrusion detection apparatus of the character indicated including an improved form of apparatus and system for indicating the location of an intrusion violation.

It is a further object of the invention to provide a microwave intrusion detecting apparatus and system of the character indicated utilizing the technique of path attenuation to detect the presence of an intruder for example.

It is a further object of the invention to provide microwave intrusion detecting apparatus and system of the character indicated wherein the perimeter is defined by a series of transponder repeaters, transponders or a combination of transponders and repeaters.

It is a further object of the invention to provide a microwave intrusion detecting apparatus of the character indicated wherein pulse or digital techniques are used to provide the intrusion detection in the location thereof in the data link.

SUMMARY OF THE INVENTION

In carrying out the invention in one form, a microwave system for detecting the passing of an object through a perimeter and identifying the location of such passing through is provided comprising: a pulse transmitter at one location for generating a series of RF pulses at a definite pulse repetition rate, a series of RF pulse receiving and transmitting members at successively spaced locations from said transmitter, each of said RF pulse receiving and transmitting members being adapted to receive the RF pulses from the preceding transmitting member and to transmit an RF pulse corresponding to each received RF pulse to the succeeding receiving and transmitting member, certain of said RF pulse receiving and transmitting members being transponders and being adapted to transmit an RF pulse corresponding to each received RF pulse back to the preceding RF pulse receiving and transmitting member, a terminal transponder at a location spaced from the last one of said RF pulse receiving and transmitting members and defining a perimeter therewith and said transmitter, said terminal transponder being adapted to receive said RF pulses from the last of said RF pulse receiving and transmitting members and to generate an RF pulse corresponding to each received RF pulse and to transmit same back through said perimeter of said series of pulse receiving and transmitting members, a receiver at said one location adapted to receive the pulses coming back through said perimeter, the pulse repetition time of said transmitted pulse through said pulse receiving and transmitting members and said transponder and return through the same pathway to said receiver, and a register at said receiver for indicating, in response to each RF pulse transmitted from said one location, the number of transponders transmitting an RF pulse.

In carrying out the invention in another form, the system as described is provided and further includes an indicating system at said one location for giving a signal when a specified number of RF pulses from the transponder beyond the last transponder to respond in response to the same number of RF pulses transmitted from said one location fail to return through the perimeter to said one location.

DESCRIPTION OF THE PREFERRED EMBODIMENTS

Figure 1:
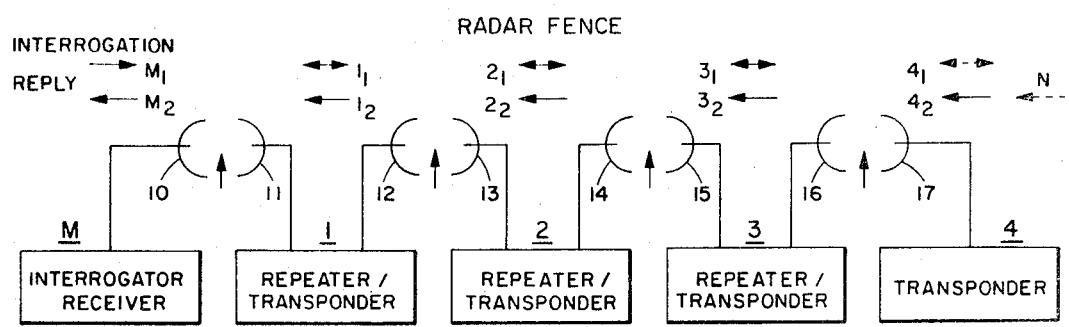
FIG. 1 is a schematic representation of a microwave intrusion detecting system according to one form of the invention.

Referring to the drawings there is shown in FIG. 1 a radar fence or perimeter, comprising locations M, 1, 2, 3 and 4 which may be arranged in any line configuration desired. For example, the locations 1 through 4 inclusive including the antenna portion of location M may define in effect a straight line or a closed pathway depending upon the circumstances of the situation and can follow any other pathway as desired so long as the microwave signal is transmittable from one antenna to the next. Thus, for example, location M may comprise the interrogator/receiver (monitoring station), each of locations 1, 2 and 3 may comprise a repeater/transponder, and location 4 may comprise a terminal transponder, all as will be more fully explained hereinafter. The repeater/transponders at locations 1, 2 and 3 may be programmed merely to repeat, that is to say, transmit a signal or pulse, further down the line or perimeter instead of transmitting such a pulse down the line as well as returning a similar signal to the preceding location, from which it first received the pulse as will become clear.

Thus, at location M, arrows $M_1$ and $M_2$ respectively show the transmission of an interrogation pulse down the perimeter and the reception of one or more reply pulses in response thereto. The double headed arrow $1_1$ at location 1 shows the transmission of the same received interrogation pulse down the perimeter and the transmission of its own reply pulse, in response to the interrogation pulse, back toward the interrogator/receiver. As to this portion of its function, location 1 is acting as a repeater and a transponder. The single headed arrow $1_2$ at location 1 shows the transmission of one or more reply pulses received from farther down the perimeter back toward the interrogator/receiver.

As to this portion of its function, location 1 is acting as a repeater of a reply pulse.

The double headed arrows $2_1$ and $3_1$ and the single headed arrows $2_2$ and $3_2$ at locations 2 and 3 have the same significance as the corresponding double headed arrow $1_1$ and single headed arrow $1_2$, respectively, at location 1.

In the event that location 1 is programmed to act as a repeater only it would transmit a pulse received from location M down the perimeter to location 2, but it would not send back to location 1 a reply pulse of its own. It would transmit, that is repeat, a reply pulse from farther down the perimeter, for example, from location 2 to location M. Similarly, if location 3 were programmed to act as a repeater only. The arrows $4_1$ and $4_2$ at location 4 show the reception of the same interrogation pulse and the transmission of a reply pulse back through the perimeter to the interrogator receiver, location M, which corresponds to the control or monitoring station of the system. The overall functioning of the system may be understood by considering that the operator at monitoring station M wishes to interrogate the system to determine whether the perimeter defined by locations M, 1, 2, 3, 4 . . . has been violated such as by one or more persons crossing the microwave pathway between antennas 10 and 11, 12, and 13, 14 and 15, and 16 and 17. Consider the action of the system relative to one pulse, realizing that the pulses are sent at a certain repetition rate. Thus, the operator at monitoring location M would send a pulse down the perimeter from transmitting antenna 10 to receiving antenna 11, the repeater/transponder at location 1, acting as a repeater only, would transmit that pulse through antenna 12 to antenna 13. The repeater/transponder at location 2, acting in its dual capacity would receive the pulse from antenna 13, transmit a pulse from its antenna 14 to antenna 15 (i.e., act as a repeater) and at the same time would re-transmit its own pulse by antenna 13 back toward antenna 12 (i.e. acts as a transponder). The reply pulse from antenna 13 and received by antenna 12 would be re-transmitted by antenna 11 and received by antenna 10 for processing at the monitoring location M. At repeater/transponder location 2 the interrogation pulse would be transmitted by antenna 14 to antenna 15 of repeater/transponder at location 3 if acting as a repeater only would transmit the pulse through its antenna 16 to the terminal transponder antenna 17 at location 4. The pulse received by antenna 17 at location 4 would be re-transmitted by the transponder through antenna 17 and be received by antenna 16 at location 3. The repeater/transponder at location 3, acting as a repeater, would re-transmit such pulse by antenna 15 to antenna 14 at receiver/transponder location 2. The receiver/transponder at location 2, acting as a repeater, would transmit the pulse through its transmitting antenna 13 to receiving antenna 12 at location 1. The repeater/transponder at location 1, acting as a repeater, would re-transmit the pulse through its transmitting antenna 11 to the receiving antenna 10 at the interrogator/receiver station M.

As will become clear, the two locations 1 and 3, while just described to be functioning as repeaters only, may be programmed, or function, as repeater/transponders. In this event, at the same time that a pulse is transmitted from antenna 12 at location 1 to antenna 13, at location 2, a pulse is transmitted from antenna 11 to antenna 10 at interrogator/receiver or monitoring location M. And, a pulse received by antenna 15 at location 3 would be transitted through antenna 16 and at the same time a reply pulse would be transmitted by antenna 15 toward antenna 14 and back through each component of the system to the interrogator receiver station A. Thus, on the assumption that stations 1 and 3 are programmed as repeater/transponders and are functioning in the same respect as repeater/transponder at location 2 and the transponder at location 4, the interrogator/receiver station M would in response to each pulse sent out, receive back a pulse from repeater/transponders 1, 2 and 3 and from transponder 4. That is to say, the interrogator/receiver station M would receive back a number of pulses equal in number to the number of transponders in the perimeter provided that no violation of the perimeter has occurred.

If a violation of the perimeter has occured, for example between locations 2 and 3 as shown by the arrow (between antennas 14 and 15) which may represent a person walking through the microwave beam existing between antennas 14 and 15, only attenuated, or no pulses would be received by repeater/transponder location 3 and transponder location 4. Consequently, pulses would be transmitted back to interrogator/receiver location M ( sometimes referred to herein as the monitoring station) only from repeater/transponder locations 1 and 2. This is to say that the violation of the perimeter has occurred between locations 2 and 3. In other words, the violation occurred beyond the last repeater/transponder station to transmit a pulse back to the interrogator/receiver. In this manner, the operator at the interrogator/receiver station M, by noting in a data register (to be described) the number of pulses which have been received back in response to a pulse sent out can identify the point at which the perimeter violation occurred.

If a violation of the perimeter occurs between locations M and 1, that is the microwave pulse is interrupted, or strongly attenuated, between antenna 10 and 11, the interrogator/receiver would receive no pulses back and the operator at location M would know that the violation occurred between the interrogator/receiver station and the first station out. Similarly, if a violation of the perimeter occurs between locations 1 and 2, where location 1 is merely a repeater, that is to say the microwave pulse is interrupted or attenuated between antennas 12 and 13, no pulses would be returned to the interrogator/receiver location M. When location 1 is operating as a repeater only the operator at the interrogator/receiver station A would not know whether the violation occurred between antennas 10 and 11 or antennas 12 and 13. Accordingly, the repeater/transponders at locations 1 and 3 are programmed as repeaters only when this is dictated by the particular operating stations. The significant fact to be noted is that the number of reply pulses received back at the interrogator/receiver location M in response to a pulse sent out therefrom corresponds to the number of transponders which have received the pulse and sent it back to the interrogator/receiver.

Figure 2:
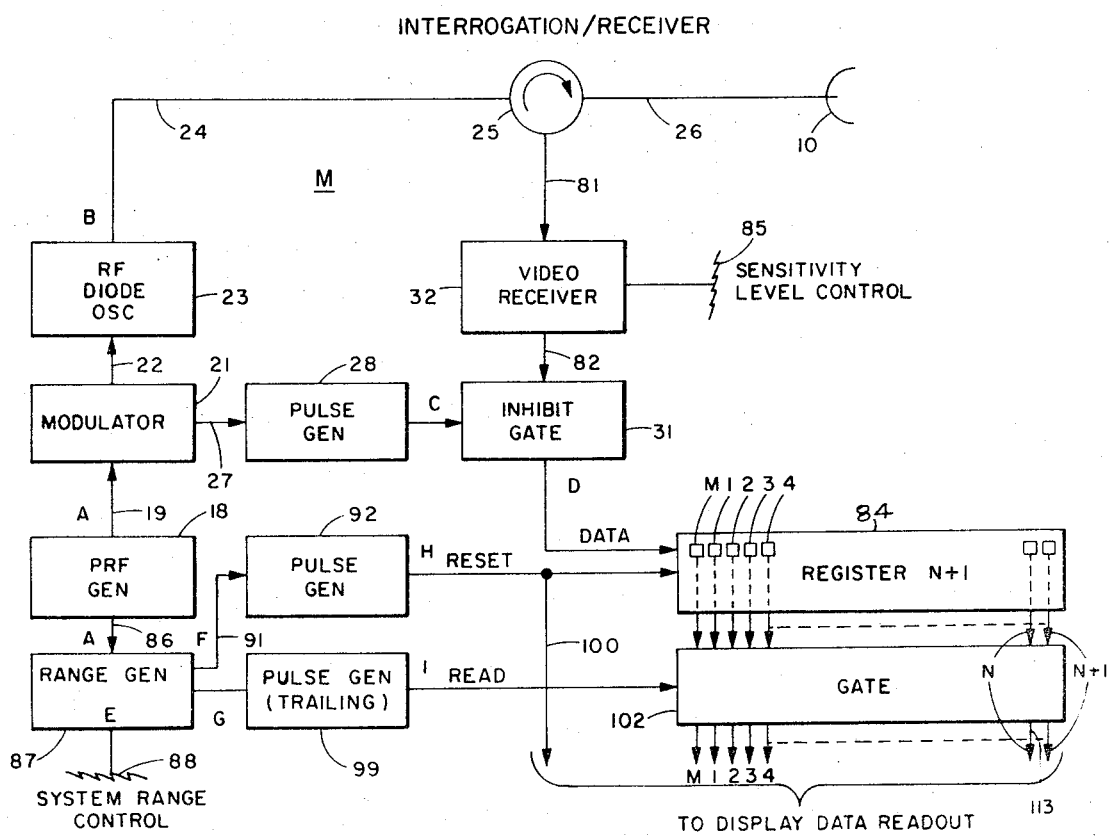
FIG. 2 is a block diagram of one portion of the system according to the invention, as shown in FIG. 1.

The operation of the interrogator/receiver location M may be understood by referring to FIG. 2. The pulse frequency generator 18 (PRF) generates a series of pulses at a predetermined frequency which in a typical case might be 100 pulses per second. The pulse repetition frequency generator 18 may be of any well known form and may generate pulses shown for example at 18A in FIG. 5, row A.

Figure 5:
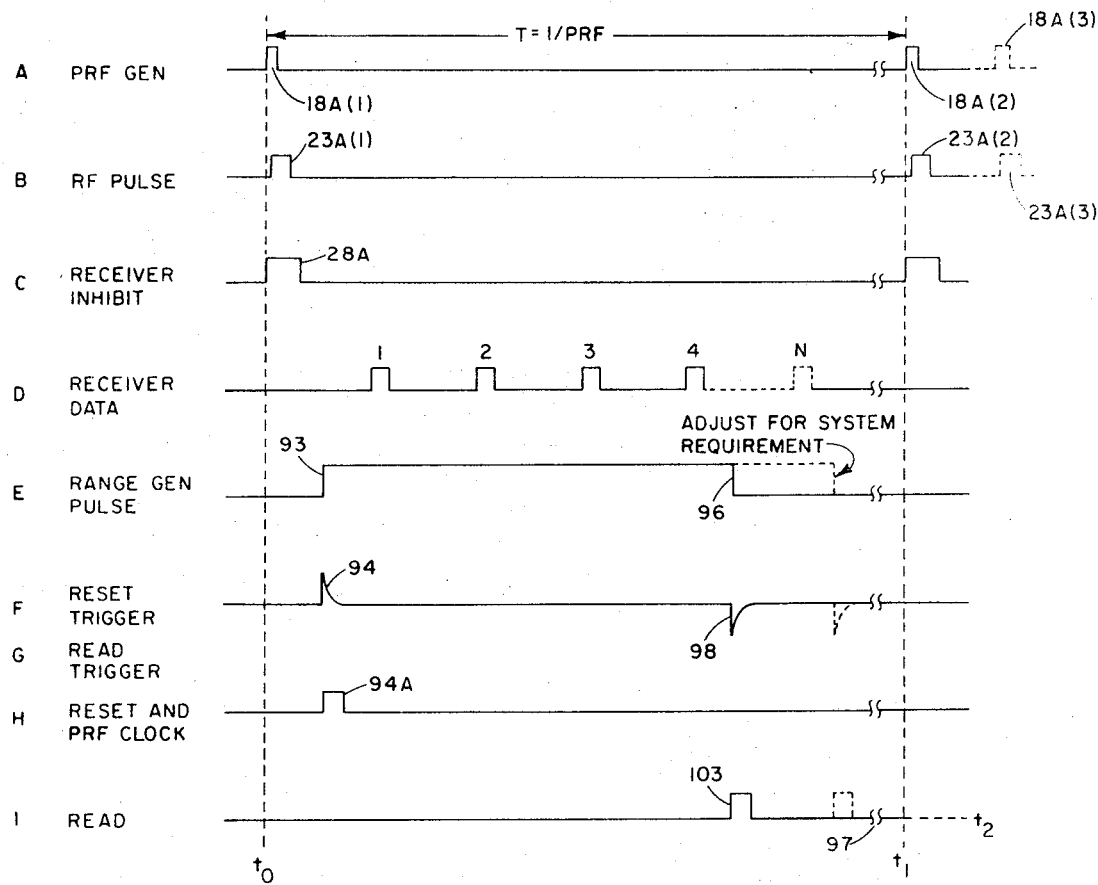
FIG. 5 is a diagram of time pulses indicating operation of the system according to the invention.

In FIG. 5, the various pulses are shown in rows A, B, C, D, E, F, G, H and I and in FIG. 2 the location or origin of the pulses in a particular row are shown associated with the component generating them.

The time between pulses 18A is shown in FIG. 5 as equal to the reciprocal of the pulse repetition frequency which is to say one one-hundredth of a second in the particular case indicated. The pulses 18A are supplied from PRF generator 18 through appropriate conductor 19 to a modulator 21 which may also be of a well known form and from the modulator 21 through an appropriate conductor 22 to an RF diode oscillator 23. From the oscillator 23 a modulated pulse 23A (FIG. 5) is generated in response to each pulse 18A. The modulated pulses 23A are supplied through an appropriate conductor 24 to a circulator or duplexer 25 which may be of a well known form from which the RF pulse is passed through an appropriate conductor 26 to the antenna 10. From the antenna 10 the interrogation or outgoing pulse 23 A1 (FIG. 5) is transmitted to the first receiving antenna in the perimeter which is shown in FIG. 1 as antenna 11.

In an actual apparatus the frequency band of the system was that defined as the X band and comprised a frequency of 10.0 gigahertz, and the width of each RF pulse 23A was, for example, three-tenths of a microsecond. That is to say, each modulated pulse 23A consisted of 3,000 cycles of the frequency band.

In FIG. 5, each RF pulse 23A is shown occurring a very short time interval after the initiation of PRF pulses 18A in order to allow for delay in build-up through the modulator 21 and RF diode oscillator 23.

The modulator 21 shapes the pulse 18A received from the PRF generator 18 in an appropriate manner for use with an RF diode oscillator as is well understood. The pulse 23A generated by modulator 23 is also supplied through an appropriate conductor 27 to a pulse generator 28 of well known form and from thence through an appropriate conductor 29 to an inhibit gate 31 of well known type. The pulse generated by pulse generator 28 is shown as 28A (row C) in FIG. 5 and acts to close inhibit gate 31 for a time interval greater than the transmission time of the RF pulse 23A in order that whatever leakage may occur through the circulator 25 and passed through the video receiver 32 will not be applied to the data register.

The interrogation RF pulse 23A transmitted by antenna 10 is received by antenna 11 (FIG. 3) showing repeater/transponder 1, assuming that there has not been a violation of the perimeter between antenna 10 and 11. The received RF pulse 23A at antenna 11 is transmitted by an appropriate conductor 33 to a circulator or duplexer 34 which transmits the pulse through an appropriate conductor 35 to a video receiver of well known form 36. The video receiver 36 detects and amplifies the received signal and transmits the same as an envelope pulse through an appropriate conductor 37 to an inhibit gate 38. The inhibit gate 38 at this point is open and transmits the received pulse to a video delay circuit of well known form 39. The video delay circuit 39 receives all of the received modulated pulse 23A and after all of this pulse is received and stored, so to speak, it supplies a trigger signal to the pulse generator 41 through an appropriate conductor 42. The same trigger pulse is supplied through an appropriate conductor 43 to a well known pulse generator 44. The pulse generator 41 generates a pulse similar to pulse 18A of the PRF generator 18 and supplies the same through a suitable conductor 45 to a modulator 46 which supplies a suitable pulse through an appropriate conductor 47 to an RF diode oscillator 48 which may be of the same form as that in the interrogator/receiver of FIG. 1.

Figure 3:
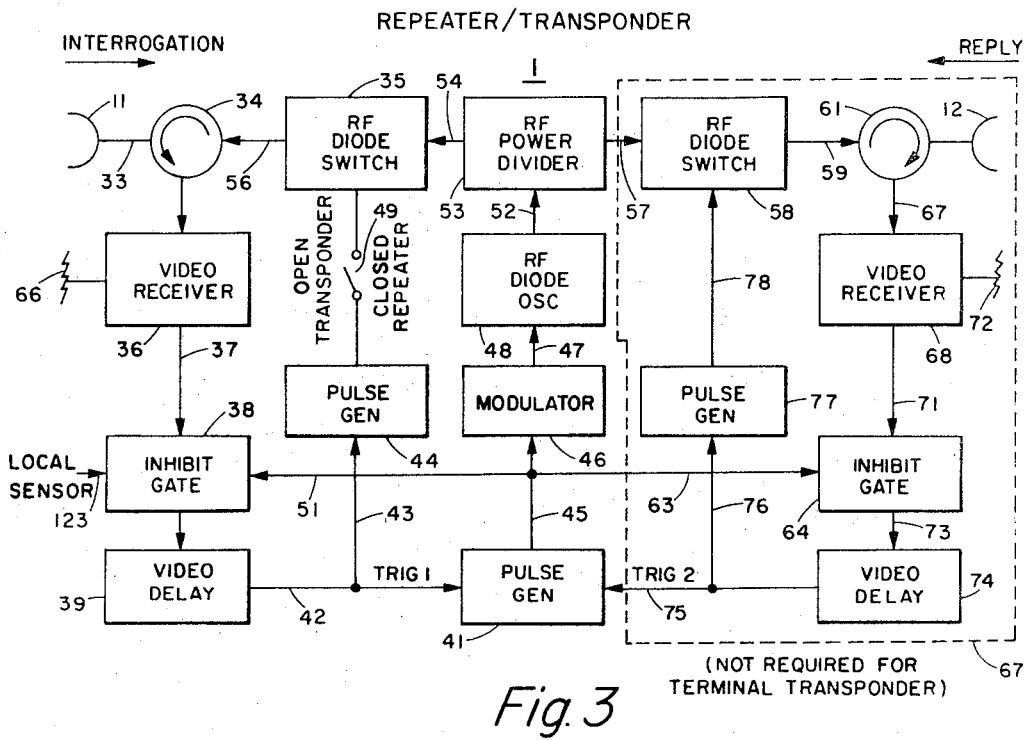
FIG. 3 is a block diagram of a further portion of the system according to the invention, as shown in FIG. 1.

Under the condition being described, the repeater/transponder 1 of FIG. 3 is acting as a transponder. Thus, the switch 49 is open. The pulse generated by pulse generator 41 also is supplied through an appropriate conductor 51 to inhibit gate 38 thereby closing this gate after all of the received RF pulse has been stored in the video delay 31 and passed thereout to pulse generator 41. The modulated RF pulse from oscillator 48 is supplied through an appropriate conductor 52 to an RF power divider 53 of well known type. From RF power divider 53 the modulated RF pulse passes through appropriate conductor 54 and through an RF diode switch 55 through an appropriate conductor 56 to the circulator or duplexer 34 and thus through conductor 33 and antenna 11 from which the pulse is transmitted back to the antenna 10 of the interrogator/receiver 1. This says to the operator or monitor M, in effect, that the perimeter is intact or secure in the range between antennas 10 and 11. Referring to FIG. 5, the RF pulse 1 shown in row D (RECEIVER DATA) is the first reply or data pulse received by the interrogator/receiver M in response to the modulated pulse sent out by antenna 10. That is to say the received pulse 1 at interrogator/receiver M corresponds to the first location other than the operating or monitoring location.

The pulse generated by the pulse generator 41 and transmitted through conductor 51 to inhibit gate 38 closes this gate so that the modulated pulse 1 (FIG. 5) which is transmitted by the circulator 34 to antenna 11 cannot pass through the video receiver and cause ring-around in the transmitting circuit of repeater/transponder at location 1.

At the same time that the pulse from the pulse generator 41 is causing a modulated reply pulse to be transmitted by antenna 11, the RF power divider 53 divides the power from RF diode oscillator 48 and supplies a portion thereof through an appropriate conductor 57 to an RF diode switch 58 of well known form and from thence through an appropriate conductor 59 to a circulator or duplexer 61. From circulator 61 the modulated RF pulse passes through an appropriate conductor 62 to the antenna 12 from which transmission of the microwave RF pulse is radiated to antenna 13 of repeater/transponder 2 as shown in FIG. 1. The pulse generated by pulse generator 41 also passes through appropriate conductor 63 to an inhibit gate 64 thereby closing this gate for a time interval as shown by the receiver inhibit pulse 28A (row C of FIG. 5) for a time interval longer than that necessary for the modulated pulse to radiate from the antenna 12. Thereby the ring-around phenomena is prevented during this pulse transmission. According it will be clear that the repeater/transponder 1, when there has been no violation of the perimeter between antennas 10 and 11 transmits a reply pulse back through antenna 11 to the interrogator/receiver and at the same time transmits a pulse forward (down the perimeter) through antenna 12 to the next receiver/transponder station 2. The reply pulse 1 from repeater/transponder location 1 will be received by antenna 10 of the interrogator/receiver M and processed through the receiver circuitry as will be subsequently described.

Under some circumstances as already alluded to, it is not necessary that the repeater/transponder at location 1 act as a transponder as has just been described, but it is sufficient for it to operate as a repeater only that is to transmit a signal down the perimeter via antenna 12 without at this same time transmitting a signal back through the perimeter via antenna 11. For repeater/transponder 1 to act as a repeater only the switch 49 is closed. Under these circumstances pulse from the video delay 39 passes through conductors 42 and 43 to pulse generator 44. The pulse generator 44 under this stimulus generates a pulse which is transmitted through an appropriate conductor 65 to RF diode switch 55 and turns this diode switch off. Hence the pulse delivered through RF power divider 52 under the impetus of the pulse from pulse generator 41 through the circuit already described does not pass through the diode switch 55 and the circulator 34 to antenna 11. In other words, no signal is transmitted back through the perimeter.

The modulated RF interrogation pulse 23A (1), FIG. 5, received by antenna 11 is of course attenuated in its transmission from antenna 10. Thus, the video receiver 36 includes a gain control 66 whereby the amplification thereof may be adjusted to compensate for the attenuation.

The video receiver 36 as well as other video receivers to be described are threshold devices and pass a signal only when the incoming signal is above a certain level indicating no interruption or high attenuation of the microwave beam, i.e., perimeter intact. If the perimeter has been violated the signal level drops below the threshold level and the repeater/transponder acts as though no signal had been received.

The spacing between locations such for example as between 1 and 2, may be any appropriate distance within the transmission and reception capabilities of the system components. For example, locations 1 and 2 may be as close as one hundred feet and as far apart as 2500 feet; typically a useful range would be in the vicinity of one thousand to fifteen hundred feet. If the ranges are close, such for example as less than 100 feet, signal attenuators should be placed in the antenna cables.

The repeater/transponder at location 2, if functioning as such, will function as described for repeater/transponder at location 1 with switch 49 open. If it is as a repeater only, it will differ from the repeater/transponder only in the fact that the switch 49, as shown in FIG. 3, is closed.

When the RF pulse has been received by the repeater/transponder 1 and transmitted down the perimeter to the receiving antenna 13 at location 2, the receiver/transponder thereat, if operating as such will operate as the repeater/transponder described in connection with FIG. 3 and will transmit a pulse 2 (FIG. 5) back through the perimeter through antenna 13, antenna 12 and antenna 11 to the interrogator/receiver M. Accordingly, pulse 2, shown as a reply pulse, would be received at a later time at the interrogator/receiver M as will become clear. This is on the assumption that the perimeter has not been violated between locations 1 and 2.

Upon this same assumption the repeater/transponder 2 transmits an RF pulse, as described, down the perimeter via antenna 14 to the repeater/transponder at location 3. The receiver/transponder at location 3 is of the same construction as shown in FIG. 3 and operates in the same manner. Thus, if the perimeter is intact between locations 2 and 3, the RF pulse will be received by antenna 15 and will be processed in the repeater/transponder as described and will be re-transmitted by antenna 15 through antennas 14, 13, 12, 11 and 10 and the repeater/transponders in the perimeter back to the interrogator/receiver at the monitoring location M. The pulse transmitted in this fashion is identified by the reference character 3, row D, receiver data, FIG. 5. At the same time a further RF pulse is transmitted via antenna 16 down the perimeter to the next location 4 via its antenna 17, location 4 being shown as a transponder only it being the end of the perimeter. The transponder at location 4 also is the same as that shown in connection with FIG. 3 and it will transmit a pulse back via antenna 17 through the perimeter to antenna 10 of the monitoring station M provided that the perimeter is intact and has not been violated. The RF reply pulse of the transponder at location 4, as received at location M is shown by reference character 4 in FIG. 5, row D.

It will be evident that additional locations may be utilized as may be desired, locations M, 1, 2, 3 and 4 being sufficient for purposes of describing the invention. Such additional locations and their RF pulses may be represented by dotted pulse N of FIG. 5, row D. Thus, the time interval between the pulse 4 and the time $t_1$ of FIG. 5 is shown as empty or dead time because no pulses are being transmitted down the perimeter. At the time $t_1$ the cycle begins repeating.

Since the location 4 is the terminal location the only function at this location is for the transponder to return a reply RF pulse back through the perimeter in the event that the perimeter has not been violated. Accordingly, the transponder at this location does not need the apparatus to transmit farther down the perimeter. This is shown in connection with FIG. 3 by the dotted line rectange 67 thereby eliminating the components which are necessary to transmit a signal down the perimeter.

Referring again to FIG. 3, the repeater/transponder at location 1, for example, it will be assumed that the perimeter has not been violated at location 2 (or even farther down the line) and that therefore the antenna 13 at this location has now transmitted a reply pulse back to antenna 12 of the repeater/transponder at location 1. This RF pulse inasmuch as it is coming from location 2 may be designated as RF pulse 2, which is transmitted by antenna 13 and received by antenna 12, again on the assumption that the perimeter has not been violated between locations 1 and 2. The pulse 2 is, after reception by antenna 12, transmitted by the appropriate conductor 62 to circulator 61 and thus through appropriate conductor 67 (FIG. 3) to video receiver 68 to inhibit gate 64 via an appropriate conductor 71. The video receiver 68 may be of a conventional form as indicated in connection with the other video receivers and includes a gain control or adjustment 72 to account for attenuation of the signal in transmission. The video receiver 68 is an amplifier detector which provides an envelope type signal or pulse in response to the modulated RF pulse received by antenna 12. The inhibit gate 64 is open under these conditions and the pulse is transmitted therethrough and through an appropriate conductor 73 to a video delay circuit 74. The video delay circuit 74 is similar to the video delay circuit 39 and functions to receive all of the RF pulse received by antenna 12 before retransmission of a pulse.

After all of the received signal is stored in the video delay circuit 74 an output pulse therefrom is transmitted over appropriate conductor 75 to pulse generator 41 which generates a pulse and causes it to move through the circuit already described in connection with repeater/transponder 1 whereby the RF pulse is transmitted through antenna 11 to the antenna at the monitoring station M. At the same time the pulse is transmitted via appropriate conductor 76 to a pulse generator 77 which corresponds in operation and construction to the pulse generator 44 and through appropriate conductor 78 to the RF diode switch 58 which closes this switch and thus prevents the repeater/transponder 1 from re-transmitting the pulse back down the perimeter. In other words, an incoming or RF reply pulse being received on antenna 12 can only pass through the repeater/transponder to antenna 11 and thus back toward the monitoring location.

The video delay circuit 74, as described in connection with videl delay circuit 39, stores the received pulse for a short interval of time in order to prevent the repeater/transponder from attempting to transmit a signal at the same time that it is receiving a signal.

At the same time that the pulse from video delay 74 is being transmitted along conductor 75 to pulse generator 41 a pulse therefrom (28A, FIG. 5) is transmitted over appropriate conductor 63 to the inhibit gate 64. The inhibit gate 64, under the circumstances just described, functions to prevent ring-around in the reply circuit of the repeater/transponder at location 1 and the RF pulse width at the inhibit gate 64 would be of the same width as pulse 28A shown in FIG. 5. The inhibit gate 64, similarly, functions when, as already described, an RF pulse is being transmitted down the perimeter through circulator 61 and antenna 12 to prevent ring-around under these circumstances. In other words, when the repeater/transponder 1 is transmitting the reply pulse ultimately designated as 3 back toward the monitoring station, any leakage of RF energy through the transmitting circuit is prevented from causing ring-around.

The reply pulse ultimately designated as 3 is then transmitted by antenna 11 received by antenna 10, assuming that the perimeter has not been violated and is directed by the circulator 25 (FIG. 2) through an appropriate conductor 81 to the video receiver 32. The incoming RF reply signal passes through and is detected and rectified by the video receiver 32 and an envelope pulse is passed by way of appropriate conductor 82 to inhibit gate 31 and thus through an appropriate conductor 84 to the N+1 register 84. The inhibit gate 31 is open to receive the reply pulse 3 and for that matter pulses 1, 2, 4 and N as shown, for example, in FIG. 5, inasmuch as this gate is open except for the time interval shown by pulse 28A. This is to say once a single pulse has been sent according to the PRF generator 18, during the sending of which the inhibit gate 31 is closed, the inhibit gate 31 is open to all reply pulses coming back through the perimeter and these pulses are conducted via appropriate conductor 83 to the register 84.

For each interrogation pulse 23A (generated by pulses 18A from PRF generator 18) that is sent out at time $t_0$, all of the reply pulses 1, 2, 3, 4 and N which come back down through the perimeter, pass through the video receiver 32 and inhibit gate 31 and the finally numbered reply pulse registers at the assigned location in the register 84. The time interval T of a full cycle of interrogation and reply equals 1/(PRF) between $t_0$ and $t_1$. The successive sending out of pulses 28A at the pulse repetition rate (i.e., 23A (2), 23A (3)) is such that pulses from each of the repeater/transponders in the perimeter has an opportunity to send back its reply pulse, if the perimeter has not been violated, before a second pulse 23A(2) at time interval $t_1$ is sent out. Thus, referring to FIG. 5 in row D, receiver data, it will be observed that pulses 1, 2, 3, 4 and N have been received and the last one received and registered in register 84 (FIG. 2) leaving a time interval from the termination of pulse 4 or N to the time $t_1$ which is in effect a dead time during which no pulses are being received by the interrogator/receiver M, and of course, none are transmitted thereby.

The video receiver 32 has a gain or sensitivity level control 85 by means of which the amplitude of signal passed by video receiver 32 is of appropriate level to actuate the register 84.

In the system as described it is intended that all of the reply pulses which are going to return, for example, pulses 1, 2, 3 and 4 in fact return to the interrogator/receiver at location M in response to the single pulse of the RF generator 18A at time $t_0$, before a second pulse 18A is sent out at time $t_1$ (FIG. 5). Of course, if there is a violation of the perimeter between locations M and 1, none of the pulses 1, 2, 3 and 4 will return because there is no pulse transmitted by the repeater/transponder. If there is a violation of the perimeter between locations 1 and 2 only the pulse 1 will return and be registered in the register 84. Similarly, if there is a violation between locations 2 and 3 only pulses 1 and 2 will return and if a violation exists between locations 3 and 4 only pulses 1, 2 and 3 will be returned. Thus, the number of pulses returned and registering in register 84 will correspond to the location of the transponder in the area of which the violation of the perimeter occurred.

Comparing FIGS. 2 and 5, whenever the PRF generator 18 generates a pulse 18A, the same is transmitted over conductor 19, as described, and also over conductor 86 to the range generator 87 which includes a system range control 88. The range generator generates a long term pulse shown as 89 in row E of FIG. 5 opposite range generator pulse. The range generator 87 supplies the reset trigger pulse 94 through an appropriate conductor 91 to a pulse generator 92, the pulse generator 92 generating the pulse 94A as shown in FIG. 5. The rising edge 93 of pulse 89 occurs a short time interval after the termination of pulse 28A as shown in FIG. 5 and triggers the reset trigger pulse 94A which passes through the conductor 95 to the register 84. The reset pulse 94, row H of FIG. 5, headed reset trigger, clears all of the information existing in the register 84 at an appropriate interval after the first PRF generator pulse 18A is transmitted at the time zero ($t_0$), and says in effect that the register 84 is now available to register the receipt of any reply pulses 1, 2, 3, 4, etc.

After the necessary time interval, for example in a certain number of microseconds, the last reply pulse N (4 in FIG. 1) which may be expected has arrived (if the perimeter has not been violated). The length of the pulse 89 is thus adjusted by the system range control 88 to be slightly longer than the total time required for all of the expected or possibly expected reply pulses to return. Thus, as shown in FIG. 5, the falling or trailing edge 96 of pulse 89 occurs after the time at which pulse N (4) is expected to return. The time between the trailing edge 96 and the time $t_1$ when a second PRF pulse 18A is generated and RF pulse 23A(A) is to be sent by the interrogator/receiver M is the system dead time as has already been described. The system dead time may be adjusted to enable all of the reply pulses, depending upon the number of transponders, in the perimeter are expected to be received. In a practical system using the X band (10 gigahertz) and bearing in mind that the duration of RF pulses 23A may be of the order of three-tenths of a microsecond, a large number of pulses 1, 2, 3, 4 and N may be received and still leave a large amount of dead time following the receipt of pulse 4 or N until the arrival of time $t_1$ when a second pulse 23A(2) is sent out.

The register 84 has N+1 digital positions in it and may be of the stepping character. Thus, if one reply pulse is received over the data line 83 the first location, 1, in register 84 will receive or rather indicate a signal, namely digital 1. This would correspond to the return of reply pulse from location 1. If a second reply pulse 2 is returned the register 84 will provide a signal in the second location 2 with none remaining in the first location. Similarly, if the pulse 3 from the third location is returned the register 84 will show a digital indication at position number 3 with no indications existing at positions 1 and 2. Likewise, if reply pulse 4 returns, which is to say that the perimeter has not been violated there will be a pulse or digital indication at position number 4 in the register 84. If there are N locations (4 in the specific example), the register 84 will have in the appropriate location a single signal corresponding to that position. The register 84 has N+1 locations besides the initial position of M, or no pulses, the reasons for which will be subsequently explained.

Referring to FIG. 5, it will be seen that the interval between $t_0$ and $t_1$ is interrupted by the wavy lines 97 in order to indicate the passage of a greater amount of time than the scale of the drawing will permit. When the trailing edge 96 of pulse 89 occurs, as determined by the system range control adjustment, a trailing edge or read trigger pulse 98 occurs, triggering the pulse generator 99 to generate the read pulse 103 that is transmitted over the read line 101 to the read gate 102. The read pulse 103 is shown on FIG. 5 opposite row I labelled read and is shown as occurring at the time of occurrence of the read trigger pulse 98 (row F, FIG. 5) which, as indicated, occurs at the trailing edge 96 of pulse 89.

In the system as described, the register between the time interval $t_0$ and $t_1$ has in it one signal corresponding to the location of the violation of the perimeter and if no violation has occurred the register 84 has a signal at the location of the Nth position. In the system as described, it is intended that the positional data existing in register 84 be read at the time of pulse 103 (row I, FIG. 5), substantially before the occurrence of the time $t_1$. That is to say the data in register 84 is read between the intervals of pulse 103 and $t_1$ before a second data RF pulse 23A is sent out. The reading of the data in register 84 is achieved through gate 102 which supplies the information existing in register 84 to the display data readout circuitry shown in FIG. 4 as will be described.

At the time that the reset pulse 94A is generated by the pulse generator 92 and supplied over conductor 95 to the register 84 to reset this register to its M or no data position, it is also supplied over conductor 100 to the display data readout of FIG. 4 as will be explained.

As indicated, it is intended that the data in register 84 be read during each interval between $t_0$ and $t_1$, that is between the occurrence of each of the PRF pulses 18A. The pulse repetition frequency (PRF) is chosen so that the desired data may be supplied by the perimeter violation system. As indicated, the PRF typically might be 100 pulses per second on the theory that a person walking through the microwave beam between any two antennas, e.g. 10 and 11 would cause an interruption or significant attenuation of the beam two or more times. That is, it would take more than two one-hundredths of a second for a person to walk through the microwave beam and if it is a vehicle, for example, that is passing through the beam, a larger number of pulse interruptions or attenuations would occur.

In this disclosure, interruption and significant attenuation of the microwave beam are considered synonomous for purposes of the invention so long as the attenuation is sufficient to provide the rate indications necessary.

Suppose for example that the first pulse 23A is sent out at time $t_0$ and a short time interval later the range generator 87 initiates the rising edge of pulse 89 and shortly thereafter a person walks through the microwave beam between antennas 10 and 11 thereby interrupting the transmission of pulse 23A to repeater/transponder at location 1. In this instance the only data recorded in the register 84 is a digit at register position M because the pulse 23A was interrupted before reaching the antenna 11 of location 1. The digit at register position M is placed thereby the reset and clock pulse 94A (row H, FIG. 5) supplied over line 95. Thus, there are no reply pulses to be received from station 2, 3 and 4 etc. If an intruder walks through the microwave beam between the antennas 12 and 13, that is between locations 1 and 2, the transmitted pulse 23A will have reached the repeater/transponder at location 1, but is interrupted before reaching the repeater/transponder at location 2. In this event the repeater/transponder 1 has an opportunity to return its reply pulse 1 to the interrogator/receiver and the pulse will be registered as a digit at register position 1 of register 84. The digit at register position M disappears because it is a stepping register. Similarly, if an intruder walks through the microwave beam between the antennas 14 and 15 there will be an interruption of the microwave beam before reaching the repeater/transponder at location 3 but the repeater/transponder at location 2 will have an opportunity to return its reply pulse to the interrogator/receiver as will the repeater/transponder at location 1. In this event there is registered in the register 84 a digit at the register position 2. The digit at register position 1 now disappears. In other words, the register 84 contains at its appropriate position a signal or digit indicating the last repeater/transponder which has returned a signal or reply pulse.

If under the particular conditions of operation 100 pulses per second for the pulse repetition rate is not fast enough, a faster rate might be used and on ther other hand if 100 pulses is faster than necessary a lesser number of pulses per second may be used.

Figure 4:
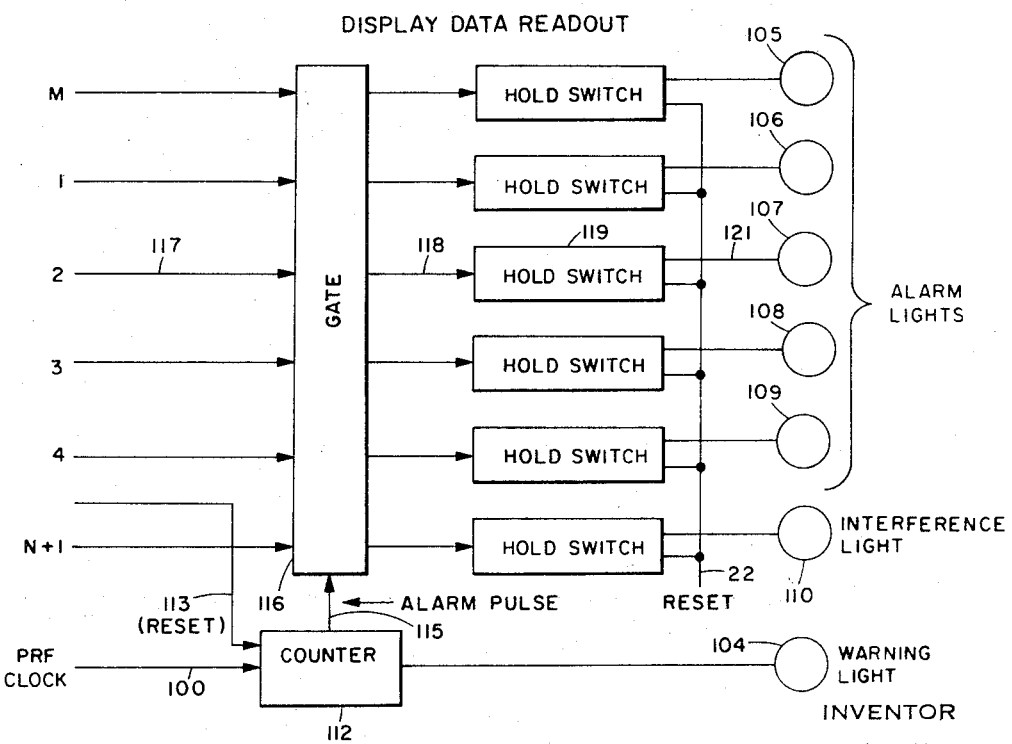
FIG. 4 is a block diagram of a still further portion of the system according to the invention.

The display data readout system as shown in FIG. 4 is correlated to the needs of the particular situation and, for example, might be set up to give a warning by lighting a warning light 104 if during any interval between $t_0$ and $t_1$, for example, a single pulse transmitted is interrupted somewhere in the perimeter which is to say that there are no digits at the location N in register 84. On the other hand, the display readout may be set up that if two pulses in succession are not returned, such for example as there is no pulse returned in the interval $t_0$ to $t_1$ and in the interval $t_1$ to $t_2$, an alarm is given as by one of the alarm lights 105, 106, 107, 108, 109, etc.

Considering now FIGS. 1 and 4, the philosophy of operation of the monitoring system, that is to say the display data readout system of FIG. 4, is that when the first pulse 23A is sent out by the interrogatory/receiver M and all reply pulses do not return, the first step of a violation of the perimeter somewhere has occurred and a warning should be sounded. Thus, if the first pulse 23A sent out does not cause return pulses because it has been intercepted between any two locations 1-2, 2-3, 3-4 or N-1 to N, the warning light 104 of FIG. 4 is turned on. This occurs by virtue of the fact that the PRF clock pulse 94A (row H of FIG. 5) and coming over line 100 puts the counter 112 to its first position. This, of course, occurs shortly after the time $t_0$. If the first pulse generated, that is to say, RF pulse 23A goes all the way down the perimeter through stations 1 to N where N is the last station and returns, N reply pulses will be provided. This means that will N pulses have been received back at the interrogator/receiver M and a digit will exist in the position N of register 84. Consequently a pulse will be provided over line N from register 84 through gate 102 and line 113 to counter 112 which resets this counter to its zero position, and there is no violation of the perimeter. In this instance, the warning light 104 does not turn on.

In the second case, it may be assumed that the pulse 23A starts down the perimeter from the interrogator/receiver at monitoring location M which sets the counter 112 as described. But in this case the pulse does not get all the way to the last transponder 4 or N, as the case may be, and thus all reply pulses are not returned to the monitoring station M. Accordingly, there will be no digit existing in the location N of the register 84 and no pulse existing on the line N to be transmitted over conductor 113 to the counter 112, and the counter thus remains in the first position. Thus, when the next PRF clock pulse is applied to counter 112, it moves to position 2, which causes an alarm signal to be applied to gate 116 and the warning signal 104 turns on. The alarm pulse is sent over line 115 to gate 116 although the alarm lights do not go on under this condition. The gate 116, however, is open to receive the next indication that a pulse did not go all the way down the line.

In the case just described, it will be assumed for purposes of description that the perimeter was tentatively violated at location 2, that is between antennas 14 and 15. If the tentative violation happened to be a bird which flew through the beam and interrupted it causing the register 84 to have a signal at its position 2, then assuming the second signal 23A(2) when sent out from the monitoring station went all the way to the end of the perimeter N(4) and all replies returned, the signal on line 113 of FIG. 3 caused the counter 112 to reset to zero thereby giving no further warning light, meaning that the perimeter was only violated by one pulse. On the other hand, when the second pulse 23A(2) goes down the perimeter and is again interrupted at location 2 between antennas 14 and 15, a digit is stored in position 2 of counter 84. Again there is no signal on line 113 to be sent to the counter and the counter now has two signals stored in it and the gate 116 is opened. Thus, when the range time has passed as shown by the trailing edge 96 of pulse 89 (row E of FIG. 5), the range generator 88 supplies a read trigger pulse 98 (row G of FIG. 5) to pulse generator 99 which generates the read pulse 103 (row I of FIG. 5). The read pulse 103 over conductor 101 opens the gate 102 and permits the signal in position 2 of the register to pass through gate 102 on line 2 and pass through line 2, (conductor 117) and through gate 116, line 118 to and through hold switch 119 and conductor or line 121 to alarm light 107. Thus, the alarm light comes on and it may be a red light for example. Additionally, the alarm might be an audible sounder, if desired.

The operator at the monitoring station M would observe the display readout and see that the alarm light 107 was on meaning that a violation of the perimeter has occurred at location 2. This is the case when two successive pulses have been interrupted at location 2. The pulse repetition frequency and the number of pulses interrupted to cause an alarm can be correlated with the size of the object to be detected (man or vehicle for example) and the expected maximum speed of penetration. The example of two missing pulses and a 100 pulse per second repetition rate represents a detection time of 0.02 seconds.

The alarm light 107 or any of the other alarm lights 105 through 109, for example, will stay on until the operator at the monitoring station M energizes the reset line 122 which de-energizes all of the hold switches and extinguishes all the alarm lights. If the violation continues as described, the alarm light 106 will again come on, and the cycle can be repeated.

As already explained hereinbefore, when a pulse 23A is sent out it passes down the perimeter and replies return in a much shorter time interval than the total time $t_0$ to $t_1$. In effect the time of travel is determined by the perimeter length plus fixed delays and the interval between $t_0$ and the time of the read pulse 103 which must be adjusted for the system. To reduce false alarms, two or more pulses must be absent. The counter 112 can be set for a higher number if slow moving objects are to be recognized.

As already described herein, the register 84 is of the stepping variety and at any one time includes a digit or signal at only one location, that location corresponding to the point in the perimeter where a violation has occurred. Thus, when the gate 102 is opened only one pulse will be available to pass therethrough and that pulse is of one existing at the particular position in the register 84 corresponding to the location of the violation. Following through on this, when the gate 116 is opened by virtue of the fact that a single pulse did not go all the way down the perimeter, that pulse passes through the gate 116 and through the hold switch to actuate the alarm light. The same situation occurs of course, depending upon where the violation occurred and could of course be any one of the alarm lights 105 through 109. An alarm is held on by the holding switch, thus subsequent violations at other points can also turn on their alarms. This would then correctly show multiple intrusion points.

If, however, when a subsequent interrogation pulse 23A is transmitted down the perimeter the violation at station 2 has cleared itself the next succeeding station where a violation occurs will be displayed in the readout system as an alarm light being on if two pulses have been interrupted there or a warning light if only one pulse has been interrupted.

Two additional situations exist which may require the actuation of either the warning light or the alarm lights. These are the instances wherein some intruder is walking around a particular repeater/transponder, as for example at location 2, but is crawling or stooping in such a way, or is too close to the antenna, that he does not interrupt the microwave beam. Referring to FIG. 3, under such a condition, the local sensor which may be a pressure sensitive device supplies a signal over conductor 123 to inhibit gate 38. Gate 38 being inhibited when an interrogation pulse 23A is sent out from the monitoring station M, the pulse does not go through and no reply pulse is returned in the manner as already described indicating that a violation has occurred between locations 1 and 2.

The other situation may be termed "interference" and could occur as for example by an aircraft flying over the perimeter and transmitting a signal at the appropriate frequency as it flies over. Such a signal would be received at a particular location by the particular receiving antenna, as for example the antenna 12 at repeater/transponder station 1. Such a signal would then be radiated by the antenna 11 and be received by antenna 10 and appear as a signal or digit in the register 84. As subsequent interrogation pulses 23A are passed down the perimeter and come back and the perimeter is not otherwise violated, there would then be N signals returned because of the repeater/transponder location and, in addition, there will be the single signal generated by the interfering object and thus there will be a signal stored at the N+1 position in the register 84. If this situation exists for one pulse only the warning light will go on since the signal is absent from the N positions in the register. The interference alarm light would of course also go on if added pulses occur in two frames in a row.

While one form of display data readout has been shown, it will be understood that other forms may be devised, it being understood that a warning light is given when one interrogation pulse is transmitted and all replies do not return and that an alarm light or signal will be turned on when two successive interrogation pulses are transmitted and all reply pulses do not return. At the same time, the display readout system indicates the location simply by counting the number of pulses which have been returned to identify the location of the violation.

The video delay in each of the repeater/transponders as for example 39 in FIG. 3, in delaying the return of a pulse after the reception thereof also functions to clear the area or discriminate against clutter of closeby reflections so that the data pulse which is returned is free thereof.

The principle of microwave intrusion detection is the shadow caused by the object that moves between two antennas. Both receivers, that is at the transmitting antenna and receiving antenna can have their gain controls, for example 66 of FIG. 3, adjusted for a level of 3 to 6 db above threshold.

The power output of any one of the repeater/transponders may be in the vicinity of 100 milliwatts peak and the receiver threshold may be −40 dbm max., this threshold being adjustable. The transmitting and receiving antennas, of course, may be highly directional and would be in a practical case.

For a maximum separation of these antennas of 1,500 feet the free space attenuation would be 105 db. To this figure it would be normal to add 5 db to cover the signal level instability of the transmitter and receiver although this would not ordinarily be more than 2 db and 3 db might be provided as a protection against random noise, etc. Thus, the system gain would be at least 110 db. If a crystal video receiver is used the minimum received signal at the detector (video receiver) should be about −40 dbm for a normally acceptable signal to noise ratio. Assuming that the use of a 30 db antenna (about 5° beam) and a 3 db RF plumbing loss at each end, the net gain of the two antennas is 54 db. Therefore, the minimum transmitter power is +16 dbm (40 milliwatts). This is within the realm of solid state oscillators at the X band.

By making the receiver at the terminal end of a transmitter receiver detecting system a transponder, the intrusion detection logic can be accomplished at the interrogator terminal without precision timing circuits or need for interconnecting synchronization signals. A second advantage of using the transponder is that the intruder's shadow characteristic is now symmetrical about the mid-point between the two antennas. This is an improvement in detection since the effect from shadowing is not as great when the object approaches the receiver terminal as when approaching the transmitter terminal. A third advantage of using a transponder is the capability of expanding the system into a chain of transponders acting also as repeaters, i.e. repeater/transponder. Such a chain can supply intrusion data to the interrogator station, thus making the single system cover many intermediate sectors of the perimeter under protection.

The antennas may have a physical size of about twelve inches square in the X band and each one could, of course, be a horn or an array.

As indicated the components herein are well known devices.

Detection is accomplished when the signal between a transmitting and receiving antenna is reduced by about 6 db. In most instances any reflection path would be down more than 6 db and therefore would not affect the performance.

In this specification, the term appropriate conductor has been used to define the link existing between various components. Appropriate conductor is defined to mean the type of conductor that is appropriate to the to the particular location. For some connections as will be understood by the man skilled in the art, a waveguide would be used, for others, a coaxial cable would be used, and for others an ordinary wire conductor would be sufficient.

What is claimed is:

1. A microwave system for detecting the passing of an object through a perimeter and identifying the location of such passing through comprising:

a pulse transmitter at one location for generating a series of RF pulses at a definite pulse repetition rate, at least one transponder at a second location spaced from said transmitter and defining a perimeter therewith, said transponder being adapted to receive said RF pulses from said transmitter and to generate and transmit RF pulses corresponding thereto, a receiver at said one location adapted to receive said RF pulses from said transponder, the pulse repetition time of said transmitter being greater than the range time of the transmitted RF pulse to said transponder and return to the receiver, and an indicating system at said receiver for giving one form of signal when one number of RF pulses is not received in response to a specified number of transmitted RF pulses and for giving a second form of signal when a second number of RF pulses is not received in response to the same specified number of transmitted RF pulses.

2. The system according to claim 1 wherein said one number of RF pulses is one and said second number of RF pulses is two successive pulses.

3. A microwave system for detecting the passing of an object through a perimeter and identifying the location of such passing through comprising:

a pulse transmitter at one location for generating a series of RF pulses at a definite pulse repetition rate, a series of RF pulse receiving and transmitting members at successively spaced locations from said transmitter, each of said RF pulse receiving and transmitting members being adapted to receive the RF pulses from the preceding transmitting member and to transmit an RF pulse corresponding to each received RF pulse to the succeeding receiving and transmitting member, certain of said RF pulse receiving and transmitting members being transponders and being adapted to transmit an RF pulse corresponding to each received RF pulse back to the preceding RF pulse receiving and transmitting member, a terminal transponder at a location spaced from the last one of said RF pulse receiving and transmitting members and defining a perimeter therewith and said transmitter, said terminal transponder being adapted to receive said RF pulses from the last of said RF pulse receiving and transmitting members and to generate an RF pulse corresponding to each received RF pulse and to transmit same back through said perimeter of said series of pulse receiving and transmitting members, a receiver at said one location adapted to receive the pulses coming back through said perimeter, the pulse repetition time of said transmitter being greater than the range time of a transmitted pulse through said pulse receiving and transmitting members and said transponder and return through the same pathway to said receiver, and a register at said receiver for indicating in response to each RF pulse transmitted from said one location, the number of returned RF pulses corresponding to the number of transponders transmitting an RF pulse.

4. The system according to claim 3 wherein the number of RF pulses received by the receiver at said one location corresponds to the location of the last transponder to transmit an RF pulse back through the perimeter.

5. The system according to claim 4 including an indicating system at said one location for giving a signal when a specified number of RF pulses from the transponder beyond the last transponder to respond in response to the same number of RF pulses transmitted from said one location fail to return through the perimeter to said one location.

6. The system according to claim 5 wherein said signal comprises one form of signal upon failure of one number of pulses to return and a second form of signal upon failure of a second number of pulses to return.

7. The system according to claim 6 wherein said one form of signal occurs upon failure of one pulse to return from a particular location and said second form of signal occurs upon failure of two successive pulses to return from said particular location.

8. A microwave system for detecting the passing of an object through a perimeter and identifying the location of such passing through comprising:

a pulse transmitter at one location for generating a series of RF pulses at a definite pulse repetition rate, a series of transponders at successively spaced locations from said transmitter, each of said transponders being adapted to receive the RF pulses from the preceding transponder and to transmit an RF pulse corresponding to each received RF pulse to the succeeding transponder and back through the preceding transponder, a terminal transponder at a location spaced from the last one of said transponders and defining a perimeter therewith and said transmitter, said terminal transponder being adapted to receive said RF pulses from the last of said transponders and to generate an RF pulse corresponding to each RF pulse received from the last of said transponders and to transmit same back through said perimeter of said series of transponders, receiver at said one location adapted to receive the pulses coming back through said perimeter, the pulse repetition time of said transmitter being greater than the range time of a transmitted pulse through said transponders and said terminal transponder and return through the same pathway to said receiver, each of said transponders being adapted to fail to transmit a signal when none is received thereby, and a register at said receiver for indicating the number of returned pulses corresponding to the number of transponders transmitting an RF pulse in response to each RF pulse transmitted from said one location.

9. The system according to claim 8 including indicating means at said one location for giving one form of signal when a specified number of RF pulses from the transponder beyond the last transponder to respond, in response to the same number of RF pulses transmitted from said one location, fail to return through the perimeter to said one location, and a second form of signal when a specified number of successive RF pulses from the transponder beyond the last transponder to respond, in response to the same number of RF pulses transmitted from said one location, fail to return through the perimeter to said one location.

10. The system according to claim 8 wherein the register provides a single digital signal whose position corresponds to the number of returned pulses.

11. The system according to claim 10 including data indicating means at said one location for giving one form of signal when a specified number of RF pulses from the transponder beyond the last transponder to respond, in response to the same number of RF pulses transmitted from said one location fail to return through the perimeter to said one location and a second form of signal when a specified number of successive RF pulses from the transponder beyond the last transponder to respond, in response to the same number of RF pulses transmitted from said one location, fail to return through the perimeter to said one location.

12. The system according to claim 8 wherein the transmitter includes a circulator for directing transmitted RF pulses only to a transponder and directing received RF pulses only to a receiver.

13. The system according to claim 3 wherein each one of said series of pulse receiving and transmitting members includes a delay means to prevent initiation of transmission of a pulse until after all of a received pulse has been received.

14. The system according to claim 11 wherein the indicating means includes counter means for adding the number of successive pulses failing to return through the perimeter, a warning signal operative in response to said counter means when a specified number of pulses fail to return and an alarm signal operative in response to said counter and gate means responsive to said counter when a specified number of successive pulses fail to return through the perimeter.

15. The system according to claim 2 wherein each one of said series of pulse receiving and transmitting members includes means having two positions, one for effecting only relaying on of an RF received pulse to a succeeding one of said pulse receiving and transmitting members and a second for effecting relaying on of an RF received pulse to a succeeding one of said pulse receiving and transmitting members and substantially simultaneous therewith relaying back of said received pulse to a preceding one of said pulse receiving and transmitting members.

* * * * *